March 7, 1967    O. G. DE LA ROCHE KERANDRAON    3,307,358
DEVICE FOR PROPELLING OR PUMPING A FLUID
AND APPLICATION THEREOF TO
THE PROPULSION OF SHIPS
Filed March 5, 1965                    2 Sheets-Sheet 1
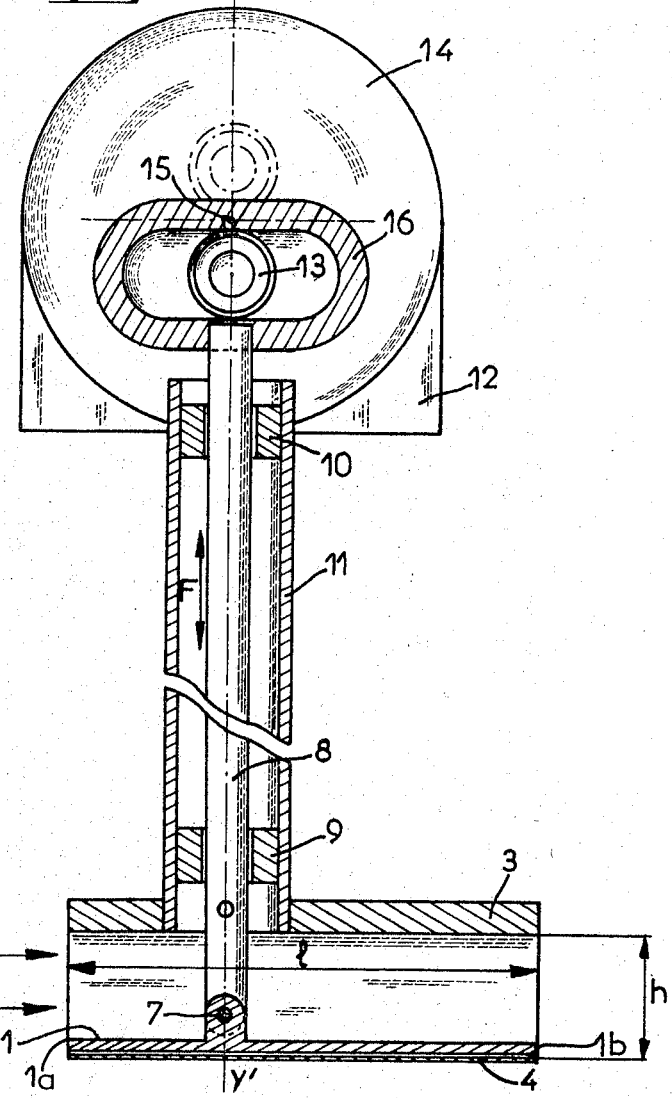
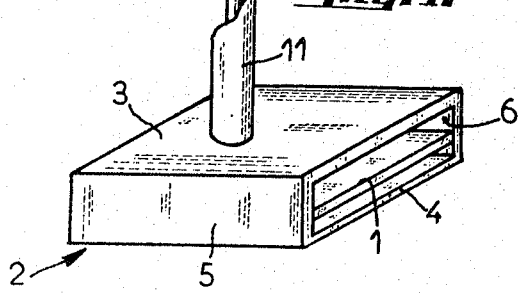

3,307,358
DEVICE FOR PROPELLING OR PUMPING A FLUID AND APPLICATION THEREOF TO THE PROPULSION OF SHIPS
Olivier Geoffroy de la Roche Kerandraon, Paris, France, assignor of one-half to Claude Christian Henry de Saulses de Freycinet, Paris, France
Filed Mar. 5, 1965, Ser. No. 437,359
Claims priority, application France, Mar. 9, 1964, 966,712
12 Claims. (Cl. 60—221)

The present invention has for its principal object a device for propelling or pumping a fluid, especially characterized in that it includes a bearing surface which is submerged in the fluid to be propelled or pumped and pivotally mounted about a pivot-pin or axle substantially parallel to the general direction of the leading edge of said surface, and means for driving said axle in a reciprocating motion along a direction substantially at right angles both to said axle and to the general direction of fluid flow through the device.

According to another feature of the invention, the aforesaid bearing surface is located within a case or housing which includes a fluid inlet port and an exhaust port, a lower wall and an upper wall against which or close to which the said bearing surface comes to lie in both its uppermost and lowermost positions as controlled by the aforesaid driving means, and two side walls which connect the said lower and upper walls and are so arranged that in its reciprocating motion, the aforesaid bearing surface moves with a low clearance between the said side walls.

According to a further feature of the invention and in accordance with one embodiment, the bearing surface is formed by a substantially flat plate.

There is thus provided a device adapted to propel and pump a fluid, which is of particularly simple construction and operation, while allowing excellent propelling efficiencies to be obtained.

According to another feature of the invention and in accordance with a preferred embodiment, the aforesaid axle is offset towards the leading edge of the bearing surface, substantially up to one third of the distance between the leading edge and the trailing edge of said surface.

In the case where the aforesaid device is used for propelling ships and according to another feature of the invention, the aforesaid bearing surface is located close to the ship hull and preferably under the surface thereof.

According to still another feature of the invention and in accordance with another embodiment, the upper surface of the aforesaid case consists of at least of a more or less important portion of the ship hull.

There is thus provided a ship-propelling unit having an excellent operating efficiency and which does not generate any prejudicial eddy motion or vibration.

The invention also encompasses, as a new product of manufacture, any ship hull equipped with the propelling device described above.

Further features of the invention will appear as the following description proceeds.

In the accompanying drawings, given by mere way of illustration:

FIGURE 1 is an external view in perspective, partly broken away, of a device according to the invention;

FIGURE 2 is an enlarged sectional view of the device shown in FIGURE 1, partly broken away;

Figure 3:
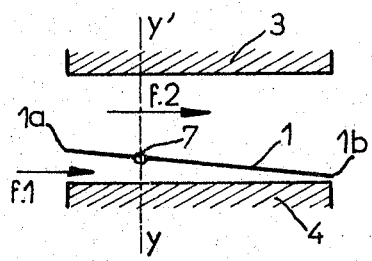
FIGURES 3 to 8 are diagrams illustrating the principle of operation of a device according to the invention.

According to the embodiment illustrated in FIGURES 1 and 2, a device according to the invention is essentially formed by a bearing surface 1 which, in the example shown, is in the form of a substantially flat, rectangular plate, and by a case 2, in the form of a rectangular parallelepiped including an upper wall 3 and a lower wall 4 and two side walls 5 and 6. The bearing surface 1 is pivotally mounted about a pivot-pin or axle 7 which may for example be carried by the free end of an operating shaft 8, driven in an up-and-down reciprocating motion along the double arrow F. The shaft 8 may for example be slidably mounted in two bearings 9 and 10 arranged in a tube or sleeve 11 which is secured, e.g. by welding, on the one hand, to the upper wall 3 of case 2 and, on the other hand, to a frame or base 12 for the whole device.

The to-and-fro movements of the shaft 8 may for example be controlled by a device which includes an eccentric 13 and is driven by a motor or engine 14 about a stationary axis 15, the eccentric 13 rolling within a race 16 fast with the shaft 8.

It is clearly apparent that the to-and-fro motion along the double arrow F imparted to shaft 8 by the race-and-eccentric system may be derived in many other manners, namely, among others, from the reciprocating piston of an internal combustion engine, steam-engine, or of a pneumatic, hydraulic or electric jack.

The materials used for constructing the device according to the invention may vary and will preferably have a good rigidity.

As clearly apparent from FIGURES 1 and 2, the pivot-pin or axle 7 of plate 1 is substantially parallel to the leading edge 1a of plate 1 when the device according to the invention is submerged in a fluid being pumped and propelled within case 2 in the direction of the arrows f (see FIGURE 2). On the other hand, it appears from FIGURE 2 that the axle 7, as designed, is offset towards the leading edge 1a of plate 1, substantially up to one third of the distance between said leading edge 1a and the trailing edge 1b of said plate 1. As a matter of fact, such an arrangement will endow the device according to the invention with a particularly high pumping efficiency, which may be over 80%, while the overall operation is particularly smooth.

Generally, the axle 7 is designed to extend substantially parallel to the leading edge of the bearing surface and to lie close to the neutral point of said surface.

Before going into the details of the operating principle of the device, it should be noted that while the bearing surface 1, as shown in FIGURES 1 and 2, consists of a substantially flat rectangular plate, said bearing surface could of course be of other shapes, especially in the form of a conventional bearing wing. Similarly, it is possible to provide various stiffening ribs on plate 1 and, generally, to apply thereto the well known methods of constructing airfoils, turbine blades, etc. Some flexibility may also be sought for in the plate.

Moreover, in the inoperative condition the bearing surface formed by plate 1 is preferably in static balance in the fluid at rest.

To allow a device according to the invention to operate with the best efficiency, a small clearance is provided between the side edges of plate 1 and the internal surfaces of the side walls 5, 6 of the case 2.

The relative dimensions, viz. the length $l$ and the height $h$ of case 2 (see FIGURE 2) may be, for example, so selected that the maximum inclination of the plate 1 in the case be of 15–20°, this ensuring a particularly good fluid propelling performance.

The principle of operation of a device according to the invention will be clearly understood from the fundamental diagrams 3 to 8. As shown in these diagrams, the device consists merely of the upper wall 3 and lower wall 4 of the case 2, of the bearing surface 1, of the axle 7 of said surface and of the axis $y'—y$ along which shaft or rod member 8 moves. The various arrows $f$ indicate the direction along which the fluid is propelled within case 2, between walls 3 and 4.

It should be noted that while the walls 3 and 4 of case 2 are termed "upper" and "lower" wall respectively, this is for mere convenience in the phrasing, since the device according to the invention may operate in whatever angular setting.

To make things clear, it will be assumed that, initially, the device is inoperative, being submerged in a liquid at rest, and that plate 1 is for instance in its lowermost position, i.e. its position shown in FIGURE 2. Upon starting of the device which imparts a reciprocating movement to the shaft or rod member 8, the axle 7 is raised and assumes one instant later the position shown in FIGURE 3. As a result of this movement, the plate 1 is urged apart from the wall upon which it was bearing, and towards plate 3. The offsetting of the axle 7 towards the leading edge 1a of plate 1 results in a disparity between the resisting torques which are created, the one on the small area of the plate comprised between the axle 7 and the leading edge 1a, and the other one the large area comprised between the axle 7 and the trailing edge 1b, so that plate 1 will rise more on side 1a than on side 1b. The fluid wherein the device is immerged will thus be subjected to a suction along the arrow $f_1$ and will move to fill the space which becomes free between plate 1 and wall 4. Correlatively, the plate 1 will expel part of the fluid comprised between its upper surface and wall 3 which, due to the inclination of plate 1, will be directed along the arrow $f_2$. There is thus initiated in case 2 a fluid flow along the general direction from the left to the right side in FIGURE 3.

Figure 4:
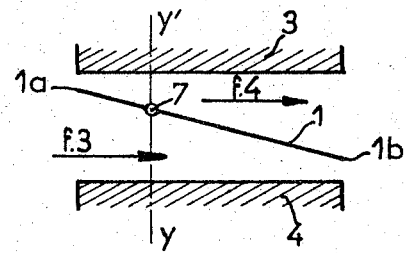

FIGURE 4 shows a position which will be assumed by the plate 1 one instant later. The suction effect continues to act on the fluid between the plate and the wall 4 and the fluid is thus drawn along the arrow $f_3$. Under the influence, on the one hand, of the fluid flow thus created and, on the other hand, of the "water wedging" effect which begins to prevail between the plate 1 and wall 3, in the vicinity of the plate leading edge 1a which is close to the wall 3, the trailing edge of the plate begins to rise rapidly towards the wall 3. The fluid in the space between the plate and said wall 3 is therefore expelled along arrow $f_4$. The flow initiated in FIGURE 3 has become more intensive.

Figure 5:
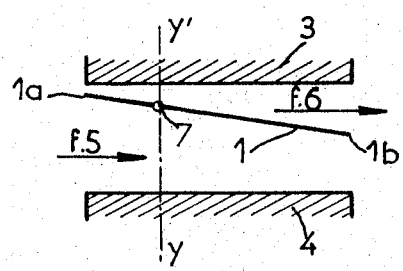

FIGURE 5 shows a position occupied by the plate still one instant later, when axle 7 is already approaching the wall 3. The "water wedging" effect at the leading edge 1a of the plate becomes preponderant and the trailing edge 1b is already approaching wall 3, this movement being promoted by the flow of the fluid drawn in the apparatus along arrow $f_5$. The fluid between the plate and the wall 3 is still being expelled along arrow $f_6$.

It will be seen that at any instant of the operation of this device, the apparatus acts to propel the liquid without any discontinuance.

Figure 6:
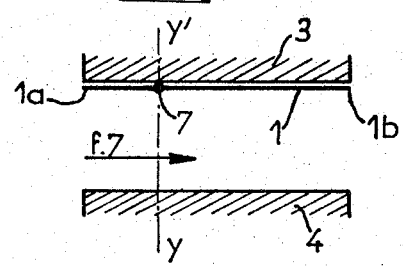

In FIGURE 6, there is shown the extreme position taken by the plate 1 when the latter is applied against the wall 3. The fluid is subjected to the action of the forces of inertia generated during its movement through the device and thus continues to move through the latter along arrow $f_7$.

Figure 7:
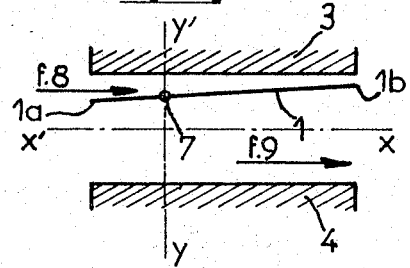
Figure 8:
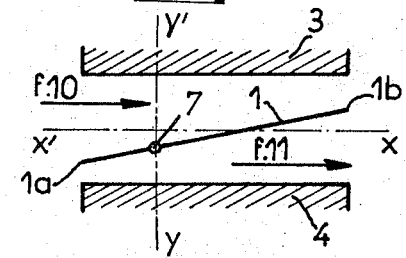

FIGURES 7 and 8 show two successive positions taken by the plate 1 during the downward movement of axle 7, the arrows $f_8$ to $f_{11}$ indicating the direction along which the fluid flows within the apparatus. The positions assumed by the plate 1 between the walls 3 and 4 of the apparatus are substantially symmetric to those taken by the same plate during the upwards movement of axle 7. Thus, in the example shown, the two FIGURES 7 and 8 may be substantially derived from FIGURES 3 and 4 through a symmetry about an axis $x'—x$ which is medial between the walls 3 and 4. However, these positions are not perfectly symmetric, taking into account the fact that the angle of incidence of plate 1 between the walls 3, 4 is dependent upon the rate of flow of the fluid between said walls 3, 4.

It should be noted that at the starting of the apparatus, the frequency of the beating movements of plate 1 must be low enough to protect the apparatus from being damaged. As the rate of flow of the fluid within the case 2 increases, this beat frequency must become higher. Advantageously, provision will therefore be made of a device such as a change-speed gear or a hydraulic coupling device arranged between the motor or engine driving the device and the eccentric 13 or the like.

Figure 9:
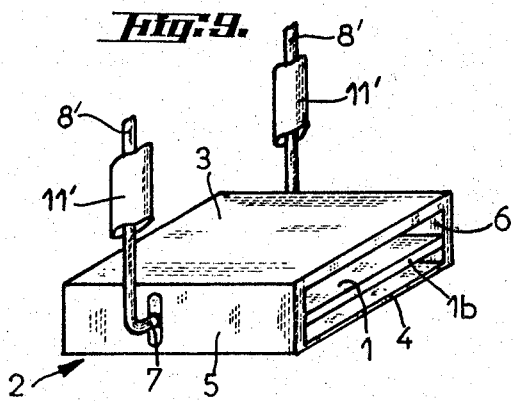
FIGURE 9 is an external view showing a modified embodiment of a device in accordance with the invention.

FIGURE 9 shows a modified embodiment of a device according to the invention, differing from the device illustrated in FIGURES 1 and 2 principally in that two shafts 8' are provided to control the to-and-fro movement of the pivot-pin 7 of plate 1 and are guided by sleeves 11' or the like; these shafts drive the two free ends of the pivot-pin 7, which extend through suitable slots in the side walls 5, 6 of case 2. There is thus provided a case 2 having a perfectly smooth internal cavity in the form of a rectangular parallelepiped, affording a very good propelling efficiency.

In the case where the propelling device according to the invention is used for propelling ships, said device operates as a jet-engine, so that its particularly good efficiency remains substantially constant. Preferably, the device will be arranged under the ship hull.

It was found that with the present device, the fluid flow through the case 2 can be very easily oriented, for example by rotating the case 2 and tube 11 as a whole about the vertical axis $y'—y$, so that the ship may be operated by means of the device according to the invention acting both as a propeller and as a rudder.

According to a modified embodiment, the upper wall 3 of case 2 may consist of at least one more or less important portion of the ship hull itself. This ensures in particular a very efficient separation of the boundary layer under the ship hull and a still higher ship-propelling performance.

Of course, the invention is by no way limited to the embodiments described and shown, which are given by mere way of example.

What I claim is:

1. A fluid propeller apparatus comprising a propelling blade pivotally mounted around a reciprocally and rectilinearly driven axle rigidly secured to a reciprocating and rectilinearly driven rod member parallel to the direction in which it is driven and normal to said axle, said propelling blade consisting of two parts extending on either side of said axle and being dissymetrically designed about said axle, and a prismatic housing containing said propelling blade and having generating lines normal to said rod member and to said axle, said housing comprising two opposite side walls normal to said rod member, and an inlet port and an outlet port located on either side of the transverse plane swept by said axle.

2. Fluid propeller apparatus according to claim 1 wherein said housing is a rectangular parallelepiped, said inlet port and outlet port extend over the whole area of two opposite faces of said housing, said propelling blade consists of a rigid plate having two opposite straight side edges, a leading edge that faces said inlet port and a trailing edge that faces said outlet port and being of such dimensions with respect to said housing that said two opposite straight side edges move with a low clearance along the two other opposite side walls of said housing.

3. Fluid propeller apparatus according to claim 1 wherein said housing is a rectangular parallelepiped, said inlet port and outlet port extend over the whole area of two opposite faces of said housing, said propelling blade consists of a plate made, at least partly, of a flexible material, said plate having two opposite straight side edges, a leading edge that faces said inlet port and a trailing edge that faces said outlet port and being of such dimensions with respect to said housing that said two opposite straight side edges move with a low clearance along the two other opposite side walls of said housing.

4. Fluid propeller apparatus according to claim 1 wherein the distance between said axle and the edge of said propelling blade that faces said outlet port is double as long as the distance between said axle and the edge of said propelling blade that faces said inlet port.

5. Fluid propeller apparatus according to claim 1 wherein the ratio between the distance between said inlet port and said outlet port and the distance between said two opposie side walls is such that the maximum value of the angle between said propelling blade and said opposite side walls is comprised between 15° and 20°.

6. Fluid propeller apparatus for propelling a ship under the impulse of a water jet-stream imparted by said fluid propeller apparatus when said latter is secured to the ship hull and submerged in the water surrounding said ship hull, said fluid propeller apparatus comprising a propelling blade pivotally mounted around a reciprocally and substantially vertically driven axle which is substantially horizontal and which extends substantially cross-wise of the ship and which is rigidly secured to a reciprocally and substantially vertically driven rod member, which extends vertically, said propelling blade consisting of two parts extending on either side of said axle and being dissymmetrically designed about said axle, and a prismatic housing containing said propelling blade and having generating lines which are substantially horizontal and extend substantially lengthwise of said ship, said housing comprising two opposite side-walls constituting a substantially horizontal bottom wall and a substantially horizontal top wall, and a forward inlet port and a rear outlet port located on either side of the transverse plane swept by said axle.

7. Fluid propeller apparatus according to claim 6 wherein said housing is a rectangular parallelepiped, said inlet port and outlet port extend over the whole area of two opposite faces of said housing, said propelling blade consists of a rigid plate having two opposite straight side edges, a horizontal leading edge that faces said inlet port and a horizontal trailing edge that faces said outlet port and being of such dimensions with respect to said housing that said two opposite straight side edges move with a low clearance along the two other opposite side walls of said housing.

8. Fluid propeller apparatus according to claim 6 wherein said housing is a rectangular parallelepiped, said inlet port and outlet port extend over the whole area of two opposite faces of said housing, said propelling blade consists of a plate, made at least partly, of a flexible material, said plate having two opposite straight side edges, a horizontal leading edge that faces said inlet port and a horizontal trailing edge that faces said outlet port and being of such dimensions with respect to said housing that said two opposite straight side edges move with a low clearance along the two other opposite side walls of said housing.

9. Fluid propeller apparatus according to claim 6 wherein the distance between said axle and the edge of said propelling blade that faces said rear outlet port is double as long as the distance between said axle and the edge of said propelling blade that faces said forward inlet port.

10. Fluid propeller apparatus according to claim 6 wherein the ratio between the distance between said forward inlet port and said rear outlet port and the distance between said substantially horizontal bottom wall and said substantially horizontal top wall is such that the maximum value of the angle between said propelling blade and any of said bottom and top walls is comprised between 15° and 20°.

11. Fluid propeller apparatus according to claim 6 wherein said substantially horizontal top wall consists of a portion of said ship hull.

12. Fluid propeller apparatus according to claim 6 wherein said housing is pivotally mounted about a substantially vertical and rotatably driven axle.

References Cited by the Examiner

UNITED STATES PATENTS

| | | | |
|---|---|---|---|
| 97,146 | 11/1869 | Alexander | 103—80 |
| 718,621 | 1/1903 | Guenther | 103—80 |
| 873,539 | 12/1907 | Guenther | 103—80 |
| 1,093,696 | 4/1914 | Guenther | 103—80 |
| 2,407,901 | 9/1946 | Petzold | 103—80 |
| 2,605,606 | 8/1952 | Pilz | 60—35.5 |

FOREIGN PATENTS 913,868    6/1954    Germany.

CARLTON R. CROYLE, *Primary Examiner.*